US012655809B2

(12) United States Patent　　　　(10) Patent No.:　US 12,655,809 B2
Shimozono et al.　　　　　　　　　　(45) Date of Patent:　　Jun. 16, 2026

(54) COMBUSTION ABNORMALITY MONITORING DEVICE FOR TWO-STROKE ENGINE

(71) Applicant: KAWASAKI MOTORS, LTD., Hyogo (JP)

(72) Inventors: Hayato Shimozono, Akashi (JP); Toshiyuki Moritake, Akashi (JP); Tomotaka Nakagawa, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 50 days.

(21) Appl. No.: 18/756,761

(22) Filed: Jun. 27, 2024

(65) Prior Publication Data

US 2026/0002488 A1　　Jan. 1, 2026

(51) Int. Cl.
*F02D 43/04*　　　(2006.01)
*G01M 15/05*　　　(2006.01)

(52) U.S. Cl.
CPC ............. *F02D 43/04* (2013.01); *G01M 15/05* (2013.01)

(58) Field of Classification Search
CPC ........ F02D 35/02; F02D 35/023; F02D 41/22; F02D 41/1498; F02D 43/04; F02D 2200/1015; F02D 2041/227; Y02T 10/40; G01M 15/05
USPC ....................................................... 123/65 R
See application file for complete search history.

(56) References Cited

U.S. PATENT DOCUMENTS

| | | | | |
|---|---|---|---|---|
| 5,862,507 | A * | 1/1999 | Wu ..................... | F02D 41/1498 |
| | | | | 701/111 |
| 5,922,948 | A * | 7/1999 | Lesko ................... | G01M 15/10 |
| | | | | 73/114.09 |
| 6,314,802 | B1 * | 11/2001 | Wu ........................ | G01M 15/11 |
| | | | | 123/436 |
| 9,458,774 | B2 * | 10/2016 | Yaguchi ................ | F02D 35/023 |
| 11,542,884 | B2 * | 1/2023 | Goodall ............. | F02D 41/3005 |
| 2004/0236494 | A1 * | 11/2004 | DeBotton ............. | G01M 15/12 |
| | | | | 701/111 |
| 2007/0051170 | A1 * | 3/2007 | Gardiner ............. | G01M 15/048 |
| | | | | 73/114.69 |
| 2011/0246049 | A1 * | 10/2011 | Matsuo ................... | F02P 5/045 |
| | | | | 701/111 |
| 2011/0303190 | A1 * | 12/2011 | Yasuda ................. | F02D 35/023 |
| | | | | 73/114.18 |
| 2015/0204249 | A1 * | 7/2015 | Glugla ................... | F02D 41/025 |
| | | | | 123/90.15 |
| 2017/0051688 | A1 * | 2/2017 | Glugla ................ | F02D 41/0002 |
| 2018/0112606 | A1 * | 4/2018 | Huang ................... | F02D 41/22 |
| 2019/0128200 | A1 * | 5/2019 | Nagappa .............. | F02D 35/024 |

FOREIGN PATENT DOCUMENTS

JP　　　　2002-155797　　　　5/2002

* cited by examiner

*Primary Examiner* — Hai H Huynh
*Assistant Examiner* — Johnny H Hoang
(74) *Attorney, Agent, or Firm* — Wenderoth, Lind & Ponack, L.L.P.

(57)　　　　　　　ABSTRACT
A combustion abnormality monitoring device for a two-stroke engine includes: a detection unit configured to detect combustion abnormality that is in-cylinder combustion triggered at a timing different from the timing of ignition; and a control unit configured to control the condition inside the cylinder when the detection unit detects combustion abnormality.

19 Claims, 8 Drawing Sheets

COMBUSTION ABNORMALITY MONITORING DEVICE FOR TWO-STROKE ENGINE

BACKGROUND

Technical Field

The present disclosure relates to a combustion abnormality monitoring device for a two-stroke engine.

Background Art

In two-stroke engines, abnormal combustion is more likely to occur, compared with in four-stroke engines, because an intake stroke and an exhaust stroke are not independent from each other. As one example of a device for detecting detonation, which is a type of abnormal combustion, JP 2002-155797 A discloses a detonation detection device for a two-cycle engine.

SUMMARY

In a two-stroke engine mounted on a motorcycle, abnormal combustion may reduce the durability of the two-stroke engine. It is therefore desirable, in a two-stroke engine, to monitor the engine for combustion abnormality, in order to improve the reliability of the engine.

An object of the present disclosure is to provide a combustion abnormality monitoring device for a two-stroke engine, by which reliability of the engine can be improved.

In order to achieve the object described above, the present disclosure provides a combustion abnormality monitoring device for a two-stroke engine, the combustion abnormality monitoring device including: a detection unit configured to detect combustion abnormality that is in-cylinder combustion triggered at a timing different from timing of ignition; and a control unit configured to control the condition inside the cylinder when the detection unit detects the combustion abnormality.

According to the present disclosure, it is possible to detect combustion abnormality that is in-cylinder combustion triggered at a timing different from the timing of ignition, and to control the condition inside the cylinder when combustion abnormality is detected. Therefore, in the two-stroke engine in which the combustion abnormality is more likely to occur, by controlling the condition inside the cylinder suitably for the combustion abnormality, the combustion abnormality can be suppressed, so that the reliability of the engine can be improved.

The present disclosure also provides a combustion abnormality monitoring device for a two-stroke engine, the combustion abnormality monitoring device including: a detection unit configured to detect combustion abnormality that is in-cylinder combustion triggered at a timing different from timing of ignition; a storage unit configured to store therein a detection result of the combustion abnormality detected by the detection unit; and a transmission unit configured to transmit the detection result of the combustion abnormality stored in the storage unit to an external device.

According to the present disclosure, because the combustion abnormality that is in-cylinder combustion triggered at a timing different from the timing of ignition is detected, the detection result of the combustion abnormality is stored, and the detection result of the combustion abnormality is transmitted to the external device, it is possible to improve the reliability of the engine, by checking the detection result of the combustion abnormality from the external device, and by controlling the condition inside the cylinder in a manner suppressing the abnormal combustion, from the external device.

The present disclosure also provides a combustion abnormality monitoring device for a two-stroke engine, the combustion abnormality monitoring device including: a storage unit configured to store big data that is an accumulation of a plurality of pieces of data related to a relationship between operation information of an engine and history information of failure and maintenance of an engine component, the failure and the maintenance being based on combustion abnormality that is in-cylinder combustion triggered at a timing different from a timing of ignition; and a prediction unit configured to predict the failure and the maintenance information of the engine component from the operation information of the engine, based on the big data stored in the storage unit.

According to the present disclosure, because the big data that is an accumulation of a plurality of pieces of data related to the relationship between the operation information of the engine and the history information of a failure and maintenance of an engine component is stored, the failure and the maintenance being based on the combustion abnormality, and the information of the failure and the maintenance of the engine component is predicted from the operation information of the engine on the basis of the stored big data, it is possible to predict a failure and maintenance of an engine component, the failure and the maintenance being based on the combustion abnormality, from the engine operation information. Hence, the reliability can be improved.

BRIEF DESCRIPTION OF DRAWINGS

The foregoing and the other features of the present disclosure will become apparent from the following description of an illustrative embodiment of the disclosure with reference to the drawings, in which.

DETAILED DESCRIPTION

Embodiments of the present disclosure will now be described with reference to drawings.

Figure 1:
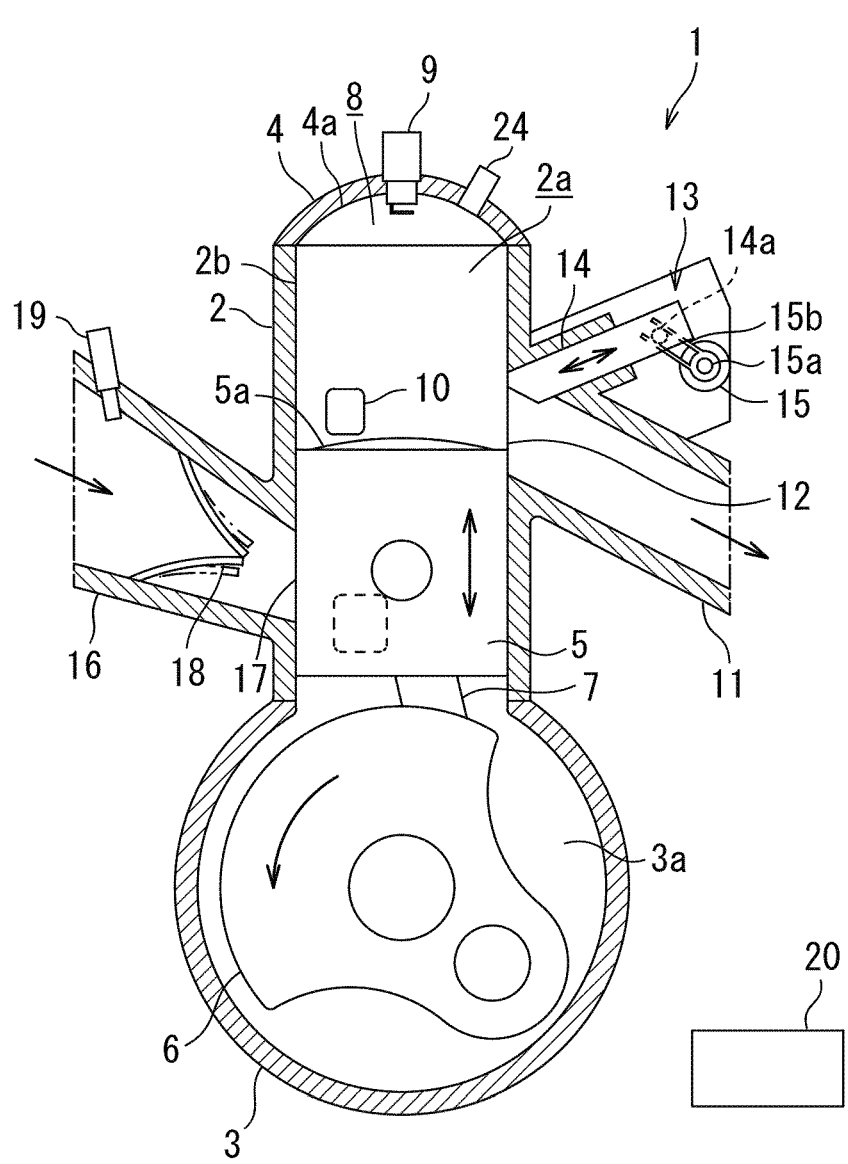
FIG. 1 is a schematic configuration diagram of a two-stroke engine of a motorcycle according to an embodiment of the present disclosure.

FIG. 1 is a schematic configuration diagram of a two-stroke engine of a motorcycle according to an embodiment of the present disclosure. An engine 1 illustrated in FIG. 1 is a two-stroke engine installed in a motorcycle, and completes one cycle of scavenging, compression, expansion, and exhaust with two strokes of a piston. The engine 1 includes a cylinder 2, a crankcase 3 connected to a lower part of the cylinder 2, and a cylinder head 4 connected to an upper part of the cylinder 2.

An inner peripheral surface 2b of the cylinder 2 delineates a cylindrical shape, and a cylinder bore 2a is formed thereby. A piston 5 is reciprocably disposed inside the cylinder bore 2a. The piston 5 is connected to a crankshaft 6 via a connecting rod 7 that is rotatably supported on the crankcase 3. A reciprocating motion of the piston 5 is converted into a rotational motion of the crankshaft 6 via the connecting rod 7. The rotational motion of the crankshaft 6 is then transmitted to the wheels of the motorcycle via a power transmission member.

Above the piston 5, a combustion chamber 8 is formed by the inner peripheral surface 2b of the cylinder 2, a top surface 5a of the piston 5, and a bottom surface 4a of the cylinder head 4. At a central portion of the bottom surface 4a of the cylinder head 4, an ignition plug 9 is disposed. The ignition plug 9 has electrodes at the tip, and is configured to ignite the fuel inside the combustion chamber 8, by generating a spark between the electrodes.

A scavenging port 10 communicating with a crank chamber 3a of the crankcase 3 and an exhaust port 12 communicating with an exhaust pipe 11 are provided on the inner peripheral surface 2b of the cylinder 2. The scavenging port 10 is opened and closed by the reciprocating motion of the piston 5, so that air-fuel mixture inside the crank chamber 3a is suctioned into the combustion chamber 8 therethrough. The scavenging port 10 may be one scavenging port, or include a plurality of scavenging ports. The exhaust port 12 is opened and closed by the reciprocating motion of the piston 5, so that the combustion gas in the combustion chamber 8 is exhausted.

The engine 1 includes an exhaust device 13. The exhaust device 13 includes an exhaust valve 14 and a motor 15 for advancing and retracting the exhaust valve 14. An arm 15a is mounted on the motor 15, and the arm 15a is engaged with a support shaft 14a supporting the exhaust valve 14. The exhaust device 13 adjusts the amount and the timing for exhausting the combustion gas by adjusting the area and the timing by and at which the exhaust port 12 is opened, by driving the motor 15 into rotation, and moving the exhaust valve 14 back and forth inside the exhaust pipe 11.

An intake port 17 communicating with an intake pipe 16 is provided on the inner peripheral surface 2b of the cylinder 2. The intake port 17 is provided with an intake valve 18. The intake valve 18 can supply air-fuel mixture containing the air and fuel through the intake pipe 16 into the crank chamber 3a. Inside the intake pipe 16, a fuel injection valve 19 is disposed. The fuel injection valve 19 injects the fuel to be mixed with the air flowing through the intake pipe 16 from upstream to downstream.

In the engine 1, when the piston 5 descends to open the scavenging port 10, scavenging takes place. Scavenging herein is a process in which a mixture of the fuel and the air in the crank chamber 3a is guided through the scavenging port 10 into the combustion chamber 8. During the scavenging, the combustion gas inside the combustion chamber 8 is exhausted through the exhaust port 12 into the exhaust pipe 11.

When the piston 5 reaches the bottom dead center and ascends to close the scavenging port 10 and the exhaust port 12, compression takes place. Compression herein is a process in which the air-fuel mixture in the combustion chamber 8 is compressed. During the compression, the pressure inside the crank chamber 3a drops to a negative pressure, to cause the intake valve 18 to open, so that the air-fuel mixture is suctioned through the intake pipe 16, into the crank chamber 3a.

When the piston 5 is at the top dead center, the ignition plug 9 ignites the fuel in the combustion chamber 8, so as to cause the air-fuel mixture having been compressed in the combustion chamber 8 to combust. This combustion causes the air-fuel mixture to expand, as high-temperature and high-pressure combustion gas. With this expansion, the piston 5 is caused to descend, and the power is generated. The descending piston 5 then increases the pressure inside the crank chamber 3a, which causes the intake valve 18 to close, so that the air-fuel mixture inside the crank chamber 3a becomes compressed.

As the piston 5 approaches the bottom dead center, the exhaust port 12 opens, and exhaust takes place. Exhaust herein is a process in which the combustion gas is exhausted into the exhaust pipe 11, as exhaust gas. This exhaust is continued until the piston 5 ascends and the exhaust port 12 is closed. In this manner, the engine 1 completes one cycle of scavenging, compression, expansion, and exhaust with two strokes of the piston 5.

In the engine 1, a controller 20 controls the fuel injection valve 19, the ignition plug 9, and the exhaust device 13. The controller 20 controls the operations of elements such as the fuel injection valve 19, the ignition plug 9, and the exhaust device 13, to control the engine 1, on the basis of a degree by which a throttle is opened, a rotation speed of the engine, a crank angle, and the like. The controller 20 is a computer having a processor, a storage device, and the like.

In the present embodiment, as a configuration related to the engine 1, a combustion abnormality detection sensor 24 is provided, as a detection unit for detecting combustion abnormality that is in-cylinder combustion triggered at a timing different from the timing of ignition by the ignition plug 9. The combustion abnormality detection sensor 24 detects an abnormal pressure inside the combustion chamber 8, that is, an abnormal in-cylinder pressure, as the combustion abnormality.

The combustion abnormality herein is combustion abnormality of the air-fuel mixture inside the combustion chamber 8, caused by the air-fuel mixture becoming compressed and causing the fuel to become self-ignited at a timing different from the timing of ignition by the ignition plug 9, in contrast with normal combustion in which the air-fuel mixture is combusted by flame propagation resultant of the air-fuel mixture becoming ignited at the timing of ignition of the ignition plug 9. Such combustion abnormality may cause a sudden pressure increase in a certain area near the ignition plug 9, such as an edge of the combustion chamber 8, e.g., a squish area, separately from the pressure increase due to the ignition by the ignition plug 9, and cause an increase in the in-cylinder pressure. Such abnormal combustion may include knocking and detonation.

Figure 2:
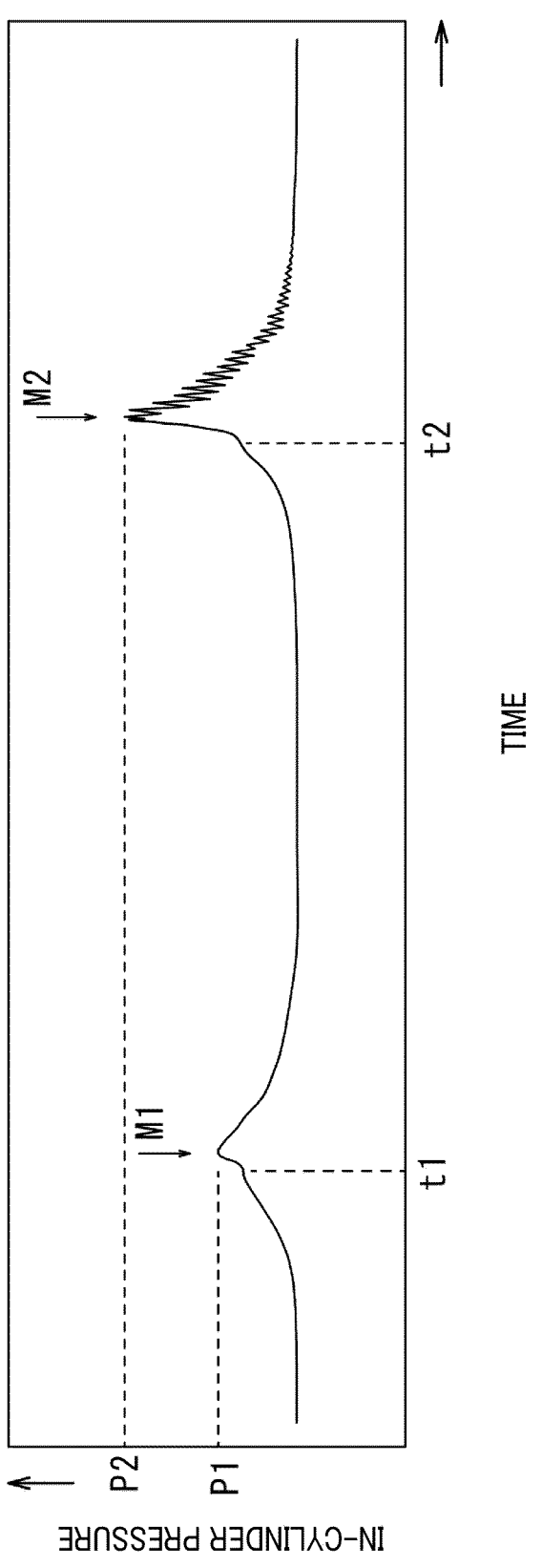
FIG. 2 is a graph for explaining normal combustion and combustion abnormality inside the engine.

FIG. 2 is a graph for explaining normal combustion and combustion abnormality inside the engine. In FIG. 2, the horizontal axis represents the time, and the vertical axis represents the in-cylinder pressure inside the combustion chamber of the two-stroke engine. During the normal combustion of the engine 1, in-cylinder pressure follows a normal in-cylinder pressure pattern in which the in-cylinder pressure exhibits a surge at the timing of ignition t1, and peaks at an in-cylinder pressure P1, as indicated as an in-cylinder pressure pattern M1. During the combustion abnormality of the engine 1, the in-cylinder pressure follows an abnormal in-cylinder pressure pattern in which the in-cylinder pressure exhibits a surge at the timing of ignition t2 but excessively, compared with that during the normal combustion, and peaks at an in-cylinder pressure P2, as indicated as an in-cylinder pressure pattern M2.

Upon detecting an in-cylinder pressure pattern that is different from the normal in-cylinder pressure pattern, the combustion abnormality detection sensor 24 detects the pattern as the combustion abnormality. In the present embodiment, the combustion abnormality detection sensor 24 detects the combustion abnormality when an in-cylinder pressure exceeding a range of that during the normal combustion has appeared.

Figure 3:
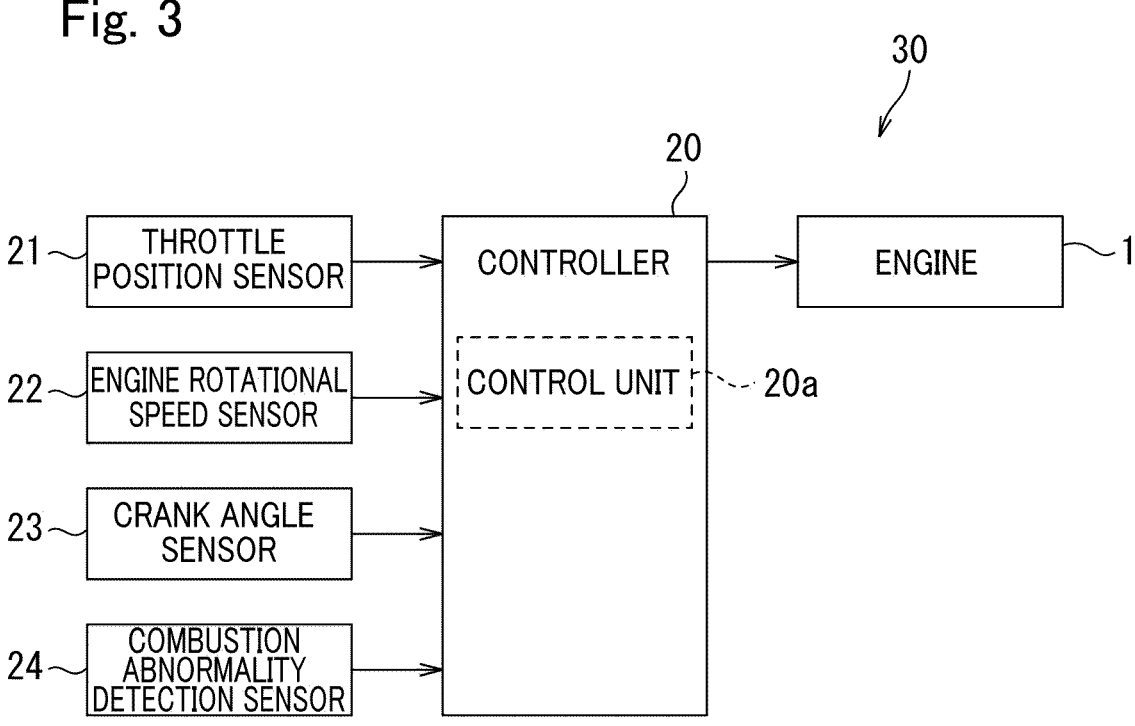
FIG. 3 is a control block diagram of a combustion abnormality monitoring device according to the first embodiment.

FIG. 3 is a control block diagram of the combustion abnormality monitoring device according to the first embodiment. As illustrated in FIG. 3, a combustion abnormality monitoring device 30 for a two-stroke engine according to the present embodiment monitors the combustion abnormality in the two-stroke engine 1 of a motorcycle, specifically, the two-stroke engine 1 including the fuel injection valve 19. The combustion abnormality monitoring device 30 includes: a detection unit 24 configured to detect combustion abnormality that is in-cylinder combustion triggered at a timing different from the timing of ignition; and a control unit 20a configure to control a condition inside the cylinder when the detection unit 24 detects the combustion abnormality.

The combustion abnormality detection sensor 24 functions as a detection unit for detecting combustion abnormality, and a control unit 20a in the controller 20 functions as a control unit for controlling the engine 1 and the condition inside the cylinder of the engine 1 when the combustion abnormality detection sensor 24 detects the combustion abnormality.

A throttle position sensor 21, an engine rotational speed sensor 22, a crank angle sensor 23, and the combustion abnormality detection sensor 24 are connected to the controller 20 in a manner enabled to output their respective detection results. The throttle position sensor 21 detects the degree by which the throttle is opened. The engine rotational speed sensor 22 detects the rotational speed of the engine. The crank angle sensor 23 detects a crank angle.

The controller 20 executes a predetermined program to control the operations of the engine 1, specifically, controls the operations of the fuel injection valve 19, the ignition plug 9, and the exhaust device 13, while the engine is in operation. The controller 20 is configured to control the operations of the fuel injection valve 19, the ignition plug 9, and the exhaust device 13 so that a predetermined amount of the fuel is injected at a predetermined timing, that the fuel is ignited at a predetermined ignition timing, and that the exhaust port 12 is opened by a predetermined opening area at a predetermined timing, on the basis of the degree of throttle opening, the engine rotation speed, the crank angle, and the like.

When the combustion abnormality detection sensor 24 detects the combustion abnormality, the controller 20 also controls the condition inside the cylinder of the engine 1 so as to suppress the combustion abnormality, specifically, so that the combustion abnormality occurs less frequently. During the combustion abnormality, the controller 20 uses a different condition for fuel injection, being different from that used during the normal combustion. Specifically, the controller 20 controls the condition inside the cylinder of the engine 1 by increasing the amount of fuel to be injected so that the combustion abnormality occurs less frequently.

Figure 4:
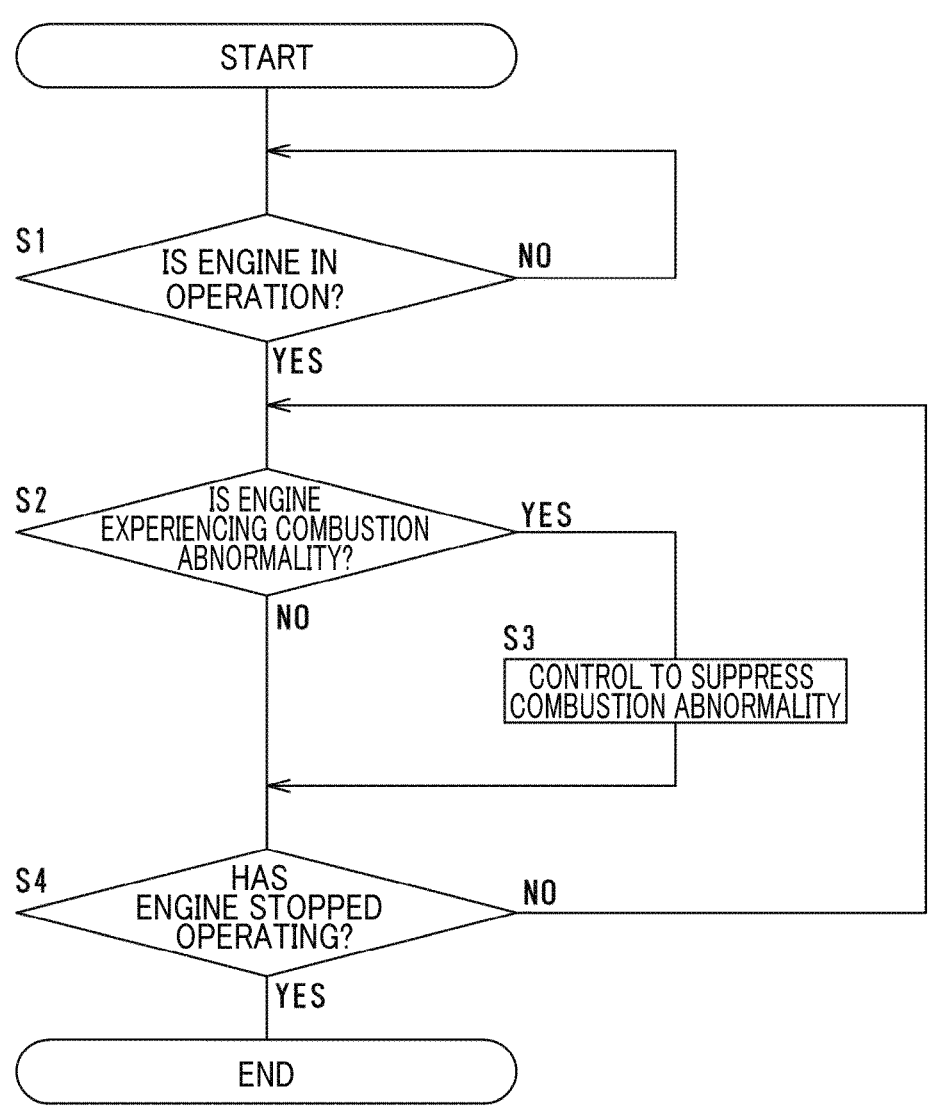
FIG. 4 is a control flowchart of the combustion abnormality monitoring device.

FIG. 4 is a control flowchart of the combustion abnormality monitoring device. To monitor the engine 1 for combustion abnormality, the controller 20 reads various signals from the throttle position sensor 21, the engine rotational speed sensor 22, the crank angle sensor 23, the combustion abnormality detection sensor 24, and the like.

As illustrated in FIG. 4, in step S1, the controller 20 determines whether the engine is in operation, on the basis of these various signals. The controller 20 determines whether the engine is in operation on the basis of the degree of throttle opening and the engine rotation speed. If the determination result in step S1 is NO, step S1 is repeated.

If the determination result is YES in step S1, the controller 20 determines whether the engine 1 is experiencing combustion abnormality in step S2. If the determination result in step S2 is YES, that is, if the combustion abnormality detection sensor 24 detects the combustion abnormality, the control for suppressing combustion abnormality is performed in step S3. As the control for suppressing the combustion abnormality, the operation of the fuel injection valve 19 is controlled to increase the amount of fuel injection, with respect to the amount used during the normal combustion, so as to suppress the combustion abnormality. If the control for suppressing combustion abnormality is finished, the processing goes to step S4. If the determination result in step S2 is NO, the processing also goes to step S4.

In step S4, it is determined whether the engine has been stopped operating. It is determined whether the engine has been stopped operating on the basis of the throttle opening and the engine rotation speed. If the determination result in step S4 is YES, the monitoring of the combustion abnormality in the engine 1 is ended. If the determination result in step S4 is NO, steps S2 to S4 are repeated. If the determination result in step S2 changes from YES to NO, the control for suppressing the combustion abnormality in step S3 is ended.

As described above, the combustion abnormality monitoring device 30 for a two-stroke engine according to the present embodiment includes: the detection unit 24 configured to detect combustion abnormality that is in-cylinder combustion triggered at a timing different from the timing of ignition; and the control unit 20a configured to control a condition inside the cylinder when the detection unit 24 detects combustion abnormality.

With this configuration, it is possible to detect combustion abnormality that is in-cylinder combustion triggered at a timing different from the timing of ignition, and to control the condition inside the cylinder when the combustion abnormality is detected. Therefore, in the two-stroke engine in which the combustion abnormality is more likely to occur, by controlling the condition inside the cylinder suitably for the combustion abnormality, the combustion abnormality can be suppressed, so that the reliability of the engine can be improved.

In the present embodiment, when the combustion abnormality is detected, the controller 20 suppresses the abnormal combustion by enhancing the ignition of the ignition plug 9 by increasing the amount of fuel injection; however, the controller may also be configured to suppress the combustion abnormality by controlling the fuel injection valve 19 so as to reduce the amount of fuel injection in a manner suitable for the combustion abnormality, or suppress the abnormal combustion by controlling the operation of the fuel injection valve 19 so as to increase or to decrease the frequency of fuel injection, that is, by controlling the number of times the fuel is injected.

The controller 20 may also configured to control the condition inside the cylinder to suppress the abnormal combustion by changing the condition of ignition by the ignition plug 9, instead of changing the condition for injecting fuel. For example, the controller 20 may be configured to control the condition inside the cylinder to suppress the abnormal combustion by changing the condition of ignition by the ignition plug 9, e.g., by delaying the timing of ignition with respect to the timing used during the normal combustion.

The controller 20 may also be configured to control the condition inside the cylinder to suppress the abnormal combustion by changing the condition of intake and exhaust, instead of changing the condition for injecting fuel. The controller 20 may be configured to suppress the abnormal combustion by controlling the operation of the exhaust device 13 so as to change the exhaust condition, by using a larger opening area of the exhaust port 12, with respect to that used during the normal combustion. It is also possible to suppress the abnormal combustion by controlling the operation of the exhaust device 13 so that the area and the timing for opening the exhaust port 12 are changed suitably for the combustion abnormality, from those used during normal combustion.

It is also possible to use an intake device capable of adjusting the area and the timing by and at which the intake port 17 is opened, instead of the intake valve 18 of the engine 1, and the operation of the intake device may be controlled so as to suppress the abnormal combustion by changing the area and the timing at which the intake port 17 is opened, from those used during the normal combustion.

The controller 20 may also be configured to control the condition inside the cylinder to suppress abnormal combustion by combining at least two of changing the condition for injecting the fuel, changing the condition of ignition, and changing the condition of intake and exhaust.

The controller 20 may also be configured to control the condition inside the cylinder on the basis of the number of times the combustion abnormality has occurred, or on the basis of the scale of the combustion abnormality. For example, the controller 20 may control to inject a larger amount of fuel when the combustion abnormality has occurred a greater number of times, than that used when the combustion abnormality has occurred a less number of times. For example, the controller 20 may control to inject a larger amount of fuel when the in-cylinder pressure of the engine 1 experiencing the combustion abnormality is higher, compared with that used when the in-cylinder pressure of the engine 1 experiencing the combustion abnormality is lower. As the number of times the combustion abnormality has occurred, for example, the number of times the combustion abnormality has occurred per predetermined time period may be used. As the scale of combustion abnormality, for example, the level of the in-cylinder pressure of the engine 1 experiencing the combustion abnormality may be used.

The combustion abnormality monitoring device 30 for a two-stroke engine controls the condition inside the cylinder so as to suppress the combustion abnormality, but preferably, controls the condition inside the cylinder so as to eliminate the combustion abnormality, when the combustion abnormality is detected.

The combustion abnormality detection sensor 24 may also be configured to detect the combustion abnormality on the basis of a change in vibration of the engine 1. For example, the combustion abnormality detection sensor 24 may detect the vibration of the engine, and detect the engine vibration as the combustion abnormality when the vibration goes outside of a predetermined range of the vibration during the normal combustion.

As the combustion abnormality detection sensor 24, the engine rotational speed sensor 22 may be used in detecting the combustion abnormality on the basis of an engine drive region. It is also possible to examine a relationship between the engine rotation speed and the combustion abnormality of the engine 1 in advance, to establish a predetermined engine rotation speed, e.g., 12000 rpm to 12500 rpm, that is an engine drive region in which the combustion abnormality may occur, and to cause the combustion abnormality detection sensor 24 to detect the combustion abnormality when the engine rotational speed sensor 22 detects the predetermined engine rotation speed thus established. As the combustion abnormality detection sensor, any other combustion abnormality detection sensor configured to detect combustion abnormality of the engine 1 may be used. As another example of the combustion abnormality detection sensor, a knock sensor configured to detect the vibration caused by knocking in the engine 1 may be used, in replacement of the combustion pressure sensor 24 configured to detect the pressure inside the combustion chamber 8.

Figure 5:
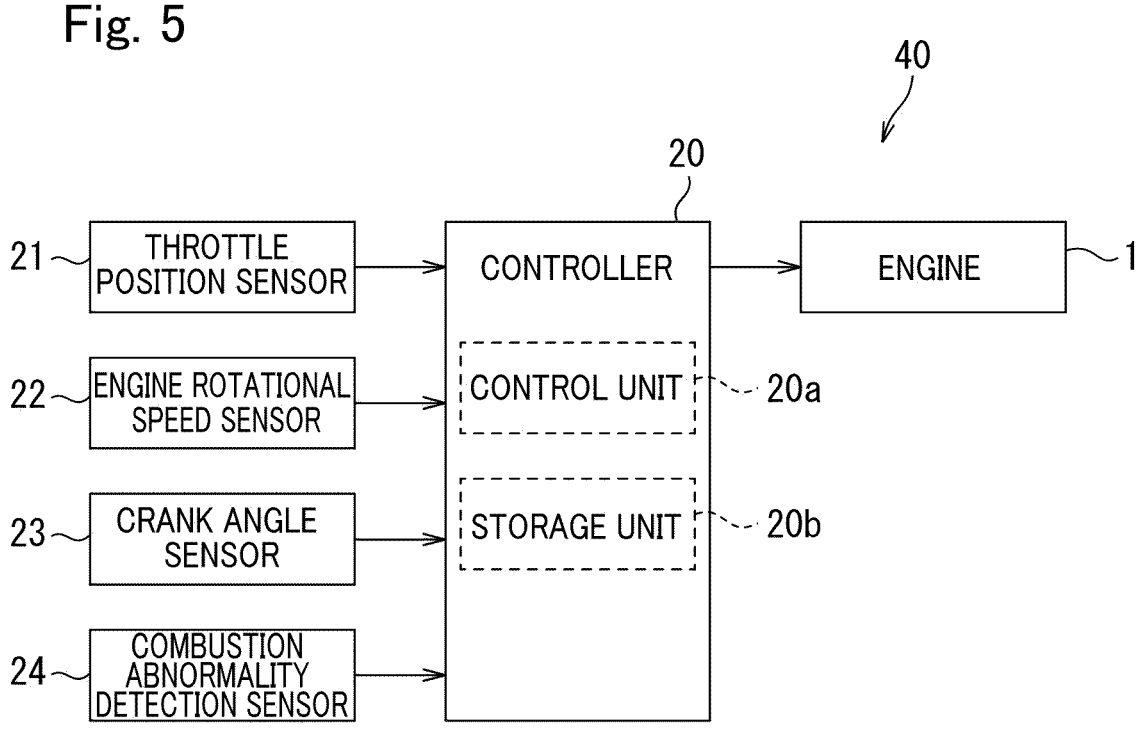
FIG. 5 is a control block diagram of a combustion abnormality monitoring device according to a modification.

FIG. 5 is a control block diagram of the combustion abnormality monitoring device according to a modification. As illustrated in FIG. 5, a combustion abnormality monitoring device 40 for a two-stroke engine may also include a storage unit 20b configured to store history information of the occurrences of the combustion abnormality, when the detection unit 24 detects the combustion abnormality, and the control unit 20a may be configured to control the condition inside the cylinder on the basis of the information of the occurrence history stored in the storage unit 20b. The controller 20 may include the storage unit 20b as well as the control unit 20a.

Figure 6:
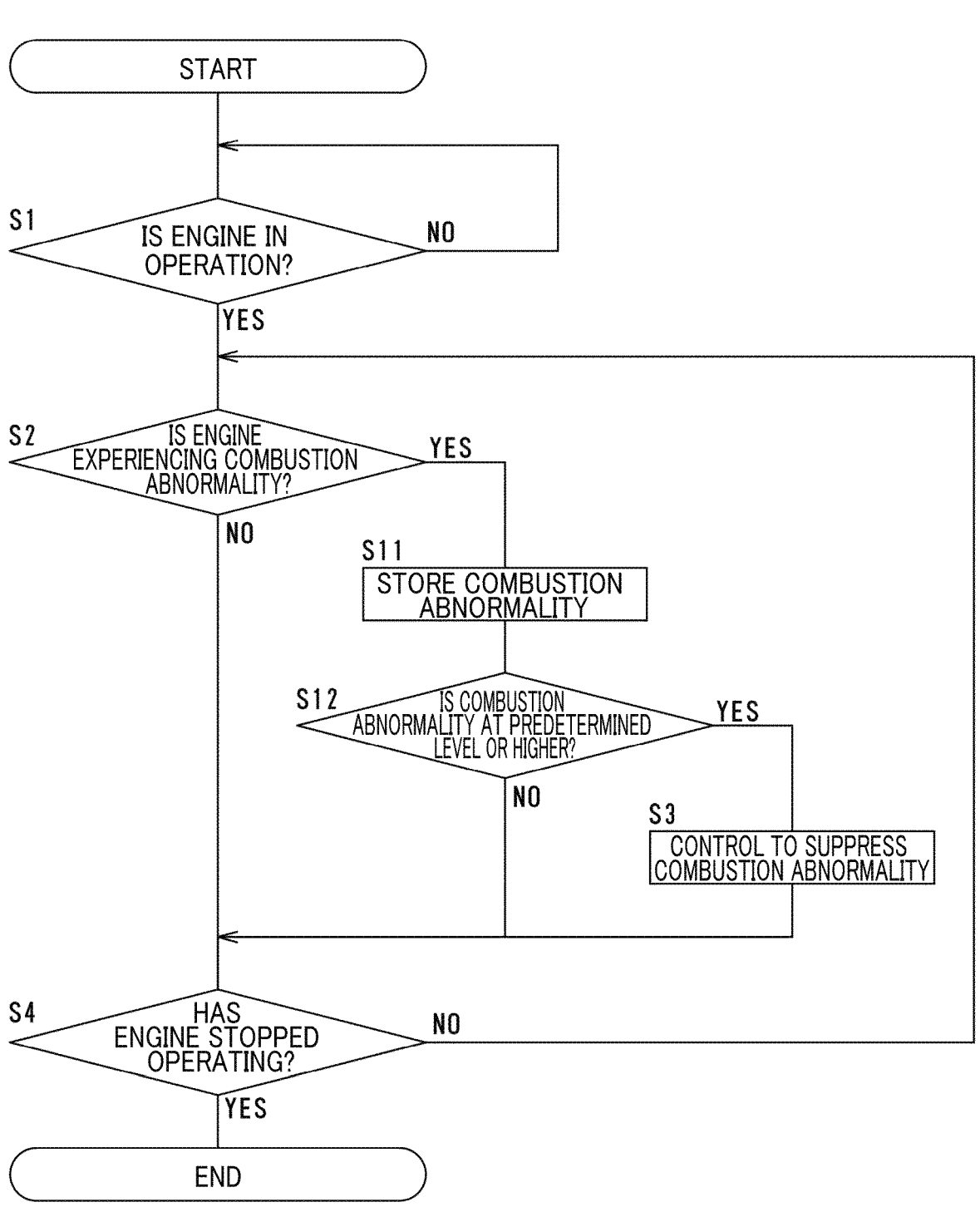
FIG. 6 is a control flowchart of the combustion abnormality monitoring device according to the modification.

FIG. 6 is a control flowchart of the combustion abnormality monitoring device according to the modification. With the configuration in which the combustion abnormality monitoring device 40 controls the condition inside the cylinder on the basis of the information of the history of past occurrences of a combustion abnormality stored in the storage unit 20b, when the determination result in step S2 is YES, the controller 20 stores the combustion abnormality in the storage unit 20b in step S11, as illustrated in FIG. 6. Once the occurrence of the combustion abnormality is stored in step S11, the processing goes to step S12.

Next, in step S12, it is determined whether the combustion abnormality stored in the storage unit 20b is at a predetermined level or higher. In step S12, for example, it is determined whether the number of occurrences of the combustion abnormality stored in the storage unit 20b has reached a predetermined number or more. If the determination result in step S12 is NO, the processing goes to step S4. If the determination result in step S2 is NO, the processing also goes to step S4.

By contrast, if the determination result in step S12 is YES, that is, if the number of occurrences of the combustion abnormality stored in the storage unit 20b is the predetermined number or more, for example, the control for suppressing combustion abnormality is performed in step S3. If the control for suppressing combustion abnormality is finished, the processing goes to step S4. If the determination result in step S2 changes from YES to NO, the control for suppressing the combustion abnormality in step S3 is ended. In step S12, for example, the number of occurrences of the combustion abnormality stored in the storage unit 20b is reset, once the control for suppressing the combustion abnormality is finished in step S3.

As described above, the combustion abnormality monitoring device 40 for a two-stroke engine may also include the storage unit 20*b* configured to store history information of the occurrences of combustion abnormality, when the detection unit 24 detects combustion abnormality, and the control unit 20*a* may be configured to control the condition inside the cylinder on the basis of the occurrence history information stored in the storage unit 20*b*.

The storage unit 20*b* may also be configured to store therein a control parameter for eliminating the combustion abnormality, as well as the detection result of the combustion abnormality detected by the detection unit 24, and the control unit 20*a* may be configured to control the condition inside the cylinder by controlling the engine 1 using the control parameter stored in the storage unit 20*b*. For example, it is possible to store a first amount of fuel injection, as a control parameter for eliminating such combustion abnormality, for a detection result of the combustion abnormality indicating that the in-cylinder pressure of the engine 1 experiencing the combustion abnormality is a first pressure or higher and lower than a second pressure, and to store a second amount of fuel injection larger than the first amount for a detection result of combustion abnormality indicating that the in-cylinder pressure of the engine 1 experiencing the combustion abnormality is the second pressure or higher.

Figure 7:
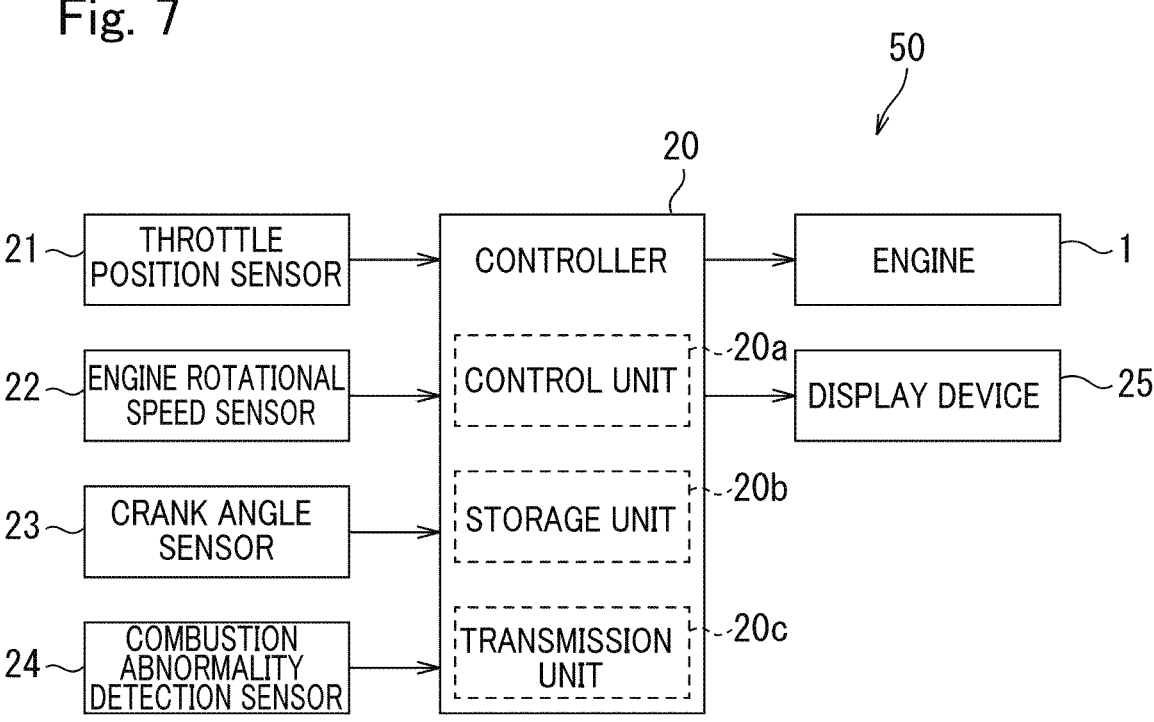
FIG. 7 is a control block diagram of a combustion abnormality monitoring device according to a second embodiment.

FIG. 7 is a control block diagram of a combustion abnormality monitoring device according to a second embodiment. This combustion abnormality monitoring device 50 for a two-stroke engine according to the second embodiment is configured to transmit a detection result of the combustion abnormality, when such combustion abnormality is detected, to an external device. Such a combustion abnormality monitoring device 50 may be used at the time of tuning the engine 1, for example. A description of the same configurations as those in the combustion abnormality monitoring device according to the first embodiment will be omitted hereunder.

As illustrated in FIG. 7, the combustion abnormality monitoring device 50 for a two-stroke engine includes the detection unit 24 configured to detect combustion abnormality that is in-cylinder combustion triggered at a timing different from the timing of ignition, the storage unit 20*b* configured to store therein a detection result of the combustion abnormality detected by the detection unit 24, and a transmission unit 20*c* configured to transmit the detection result of the combustion abnormality stored in the storage unit 20*b* to an external device 25. The controller 20 may include the storage unit 20*b* and the transmission unit 20*c*, as well as the control unit 20*a* for controlling the engine 1.

As the external device 25, a display device 25 having a display screen for displaying information to a user who is responsible for tuning the engine 1 is used. The detection result of the combustion abnormality is displayed on the display screen of the display device 25. As the detection result of the combustion abnormality, for example, the number of occurrences of the combustion abnormality is displayed. The display screen of the display device 25 is controlled by the controller 20.

In the present embodiment, too, the combustion abnormality detection sensor 24 is used as the detection unit 24 for detecting the combustion abnormality. The storage unit 20*b* included in the controller 20 stores therein a detection result of combustion abnormality, detected by the combustion abnormality detection sensor 24. The storage unit 20*b* stores therein the number of occurrences of the combustion abnormality, for example. The transmission unit 20*c* included in the controller 20 transmits the detection result of the combustion abnormality stored in the storage unit 20*b*, to the display device 25. For example, the transmission unit 20*c* displays the number of occurrences of combustion abnormality on the display screen of the display device 25.

The storage unit 20*b* included in the controller 20 may also store therein the scale of the combustion abnormality, as the detection result of the combustion abnormality. The storage unit 20*b* may also store therein the scale of an in-cylinder pressure under the combustion abnormality, for example. The storage unit 20*b* may store an engine rotation speed detected by the engine rotational speed sensor 22 at the time when the combustion abnormality has occurred, and store the detection result of the combustion abnormality in association with the engine drive region.

The storage unit 20*b* included in the controller 20 may be configured to store therein a control parameter for eliminating the combustion abnormality, correspondingly to the combustion abnormality, and the transmission unit 20*c* may be configured to transmit the control parameter for eliminating the combustion abnormality to the external device 25, the control parameter being a parameter corresponding to the detection result of the combustion abnormality stored in the storage unit 20*b*.

For example, the storage unit 20*b* may store therein a first amount of fuel injection as a parameter for eliminating the combustion abnormality for when the number of occurrences of the combustion abnormality is a first predetermined number or more and less than a second predetermined number; and may store a second amount of fuel injection, the second amount being larger than the first amount, as a control parameter for eliminating the combustion abnormality for when the number of occurrences of the combustion abnormality is the second predetermined number or more. The transmission unit 20*c* may be configured to transmit the control parameter for eliminating the combustion abnormality to the external device 25, the parameter corresponding to the detection result of the combustion abnormality stored in the storage unit 20*b*.

The storage unit 20*b* included in the controller 20 may be configured to store therein information used in maintenance of an engine component for the combustion abnormality, and the transmission unit 20*c* may be configured to transmit the information used in the maintenance of the engine component to the external device 25, the information corresponding to the detection result of the combustion abnormality stored in the storage unit 20*b*.

For example, when the total number of occurrences of the combustion abnormality has become a predetermined number or more, the storage unit 20*b* may store information indicating that it is the timing for replacing the piston, as information used in the maintenance of the engine component. For example, the transmission unit 20*c* may be configured to transmit the information indicating it is the timing for replacing the piston to the external device 25, on the basis of the combustion abnormality stored in the storage unit 20*b*.

Although the display device 25 is used as the external device 25, the external device 25 may be configured to suppress the abnormal combustion by controlling the condition inside the cylinder of the engine 1 using the control parameter received from the transmission unit 20*c*, instead of the display device 25 or in addition to the display device 25.

As described above, the combustion abnormality monitoring device 50 for a two-stroke engine according to the present embodiment includes the detection unit 24 configured to detect combustion abnormality that is in-cylinder combustion triggered at a timing different from the timing of ignition, the storage unit 20*b* configured to store therein a detection result of the combustion abnormality detected by the detection unit 24, and the transmission unit 25*c* configured to transmit the detection result of the combustion abnormality stored in the storage unit 20*b* to the external device 25.

With this, by enabling the detection result of the combustion abnormality to be checked from the external device 25, and by controlling the condition inside the cylinder so as to suppress the abnormal combustion from the external device 25, the reliability of the engine 1 can be improved. The external device 25 may be configured to present the detection result of the combustion abnormality to a user who is responsible for tuning the engine 1, and to prompt the user to control the condition inside the cylinder so as to suppress the abnormal combustion.

Figure 8:
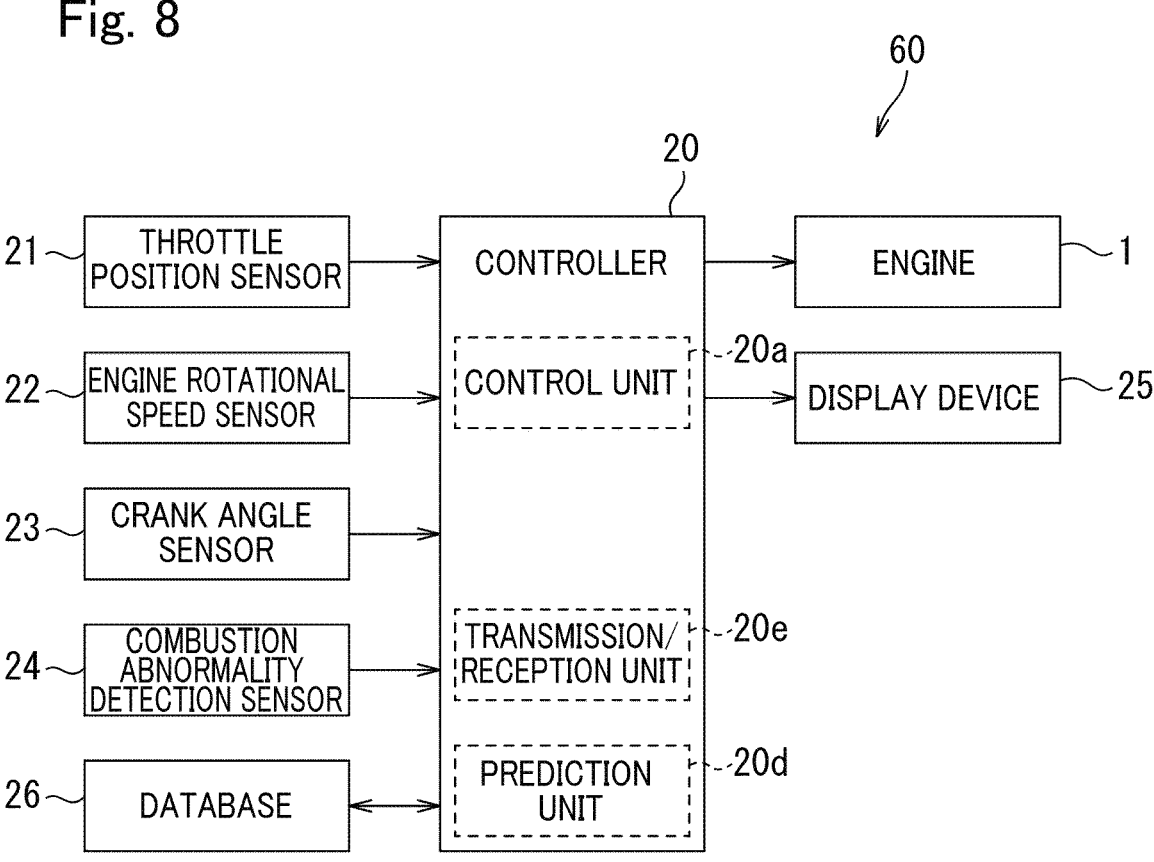
FIG. 8 is a control block diagram of a combustion abnormality monitoring device according to a third embodiment.

FIG. 8 is a control block diagram of the combustion abnormality monitoring device according to a third embodiment. This combustion abnormality monitoring device 60 for a two-stroke engine according to the third embodiment is configured to predict information of a failure and maintenance of an engine component from information of engine operation, using big data that is an accumulation of a plurality of pieces of data related to a relationship between operation information of the engine and history information of a failure and maintenance of the engine component, the failure and the maintenance being based on combustion abnormality that is in-cylinder combustion triggered at a timing different from a timing of ignition. A description of the same configurations as those according to the embodiments described above will be omitted hereunder.

As illustrated in FIG. 8, the combustion abnormality monitoring device 60 for a two-stroke engine according to the present embodiment includes a storage unit 26 configured to store therein big data that is an accumulation of a plurality of pieces of data related to a relationship between operation information of an engine and history information of a failure and maintenance of an engine component, the failure and the maintenance being based on combustion abnormality that is in-cylinder combustion triggered at a timing different from a timing of ignition, and a prediction unit 20*d* configured to predict information of the failure or the maintenance of the engine component from the operation information of the engine, on the basis of the big data stored in the storage unit 26.

As the storage unit 26, a database 26 that is a storage device separate from that included in the controller 20 is used. The controller 20 may include the prediction unit 20*d*, in addition to the control unit 20*a* for controlling the engine 1. The controller 20 may also include a transmission/reception unit 20*e* configured to transmit and to receive information to and from the database 26, and to transmit information related to a failure and maintenance of an engine component, the information being predicted by the prediction unit 20*d*, to the display device 25 that is the external device 25.

The database 26 accumulates, for each of two-stroke engines 1 corresponding to a plurality of respective motorcycles, a plurality of pieces of data related to a relationship between the operation information of the engine, and history information of failures and maintenance of an engine component, the failures and the maintenance being based on the combustion abnormality that is in-cylinder combustion triggered at a timing different from the timing of ignition, as big data.

As the operation information of the engine 1, running information of the engine 1 is used. As the running information of the engine 1, information such as the amount of fuel injected by the fuel injection valve 19 and the timing of ignition by the ignition plug 9 is used. As the history information of failures and maintenance of an engine component, the failures and the maintenance being based on the combustion abnormality, information such as the timing of a piston failure and a piston replacement that are based on the combustion abnormality is used.

As the data related to the relationship between the operation information of the engine 1 and the history information of a failure and maintenance of an engine component, the failure and maintenance being based on the combustion abnormality, data associating the operation information of the engine, such as the information of the amount of fuel injected and the timing of ignition, with the history information of a failure and maintenance of the engine component, such as the timing of a piston failure and a piston replacement, that is based on the combustion abnormality is used.

On the basis of the big data accumulated in the database 26, the prediction unit 20*d* predicts information related to a failure and maintenance of the engine component, from the operation information of the engine. As the information of maintenance, timing of maintenance, a component requiring maintenance, a maintenance task for the component requiring maintenance, and the like are used.

As the operation information of the engine, environment information and the running information of the engine may be used. Examples of the environment information include a temperature, a weather, a humidity, and/or a fuel type, and examples of the running information include the amount of fuel injected, the timing of fuel injection, and/or the timing of ignition. As the information of the failure and the maintenance of an engine component, information such as a time-to-failure, a lifetime, timing at which a failure has occurred, and the time at which the engine component is replaced may be used. A plurality of pieces of data associating the operation information of the engine with the history information of a failure and maintenance of an engine component may be accumulated in the database 26 as big data.

Based on the big data accumulated in the database 26, the prediction unit 20*d* may predict the timing of failure and the timing of maintenance of an engine component, from operation information of the engine, e.g., an engine injecting a predetermined amount of fuel at a predetermined ambient temperature, such as 40 degrees.

The transmission/reception unit 20*e* included in the controller 20 may be configured to transmit the information of a failure and maintenance of the engine component, the information being predicted by the prediction unit 20*d*, to the display device 25. By displaying the information of the failure and the maintenance of the engine component on the display device 25, the user can be notified of the timing at which the engine component is to fail or to be maintained, so that the user can create a maintenance plan in accordance with the timing at which the engine component is to fail or to be maintained.

As described above, the combustion abnormality monitoring device 60 for a two-stroke engine according to the present embodiment includes the storage unit 26 configured to store therein big data that is an accumulation of a plurality of pieces of data related to a relationship between operation information of an engine and history information of a failure and maintenance of an engine component, the failure and the maintenance being based on combustion abnormality that is in-cylinder combustion triggered at a timing different from a timing of ignition, and the prediction unit 20*d* configured to predict information of the failure or the maintenance of the engine component from the operation information of the engine, on the basis of the big data stored in the storage unit 26.

With this, because information of a failure and maintenance of an engine component is predicted from the operation information of the engine, on the basis of big data that is an accumulation of a plurality of pieces of data related to the relationship between the operation information of the engine and the history information of a failure or maintenance of an engine component, the failure and the maintenance being based on the combustion abnormality, it is possible to predict a failure and maintenance of an engine component, the failure and the maintenance being based on the combustion abnormality, from the engine operation information. Hence, the reliability can be improved.

As described above, the combustion abnormality monitoring device 30, 40 for a two-stroke engine according to the present embodiment includes: the detection unit 24 configured to detect combustion abnormality that is in-cylinder combustion triggered at a timing different from the timing of ignition; and the control unit 20*a* configured to control the condition inside the cylinder when the detection unit 24 detects combustion abnormality.

With this configuration, it is possible to detect combustion abnormality that is in-cylinder combustion triggered at a timing different from the timing of ignition, and to control the condition inside the cylinder when the combustion abnormality is detected. Therefore, in the two-stroke engine 1 in which the combustion abnormality is more likely to occur, by controlling the condition inside the cylinder suitably for the combustion abnormality, the combustion abnormality can be suppressed, so that the reliability of the engine 1 can be improved.

Furthermore, the control unit 20*a* may control the condition inside the cylinder so as to reduce the frequency at which the combustion abnormality occurs, when the detection unit 24 detects the combustion abnormality. As a result, it is possible to improve the reliability of the engine 1 by reducing the frequency at which the combustion abnormality occurs.

Furthermore, it is also possible to provide the storage unit 20*b* configured to store history information of the occurrences of combustion abnormality when the detection unit 24 detects combustion abnormality, and the control unit 20*a* may be configured to control the condition inside the cylinder on the basis of the occurrence history information stored in the storage unit 20*b*. As a result, by using the history information of the occurrences, it is possible to suppress abnormal combustion more effectively, compared with a configuration in which the condition inside the cylinder is controlled every time the combustion abnormality occurs.

Furthermore, the control unit 20*a* may also control the condition inside the cylinder suitably for the number of occurrences of the combustion abnormality, or suitably for the scale of the combustion abnormality detected by the detection unit 24. In this manner, by controlling the condition inside the cylinder suitably for the severity of the combustion abnormality, it is possible to suppress the combustion abnormality effectively.

Furthermore, the control unit 20*a* may be configured to control the condition inside the cylinder by changing at least one of the condition for injecting the fuel, the condition for igniting, and the conditions of intake and exhaust. In this manner, it is possible to suppress the combustion abnormality using the engine components mounted on the two-stroke engine 1.

Furthermore, the control unit 20*a* may be configured to control the condition inside the cylinder to a condition for eliminating the combustion abnormality. In this manner, it is possible to suppress combustion abnormality, and to improve the reliability of the engine 1.

Furthermore, it is also possible to provide the storage unit 20*b* storing therein a control parameter for eliminating the combustion abnormality, as well as the detection result of the combustion abnormality detected by the detection unit 24, and the control unit 20*a* may be configured to control the condition inside the cylinder by controlling the engine 1 using the control parameter stored in the storage unit 20*b*. In this manner, by setting the control parameter for eliminating combustion abnormality suitably for the combustion abnormality in advance, the abnormal combustion can be suppressed effectively.

The detection unit 24 may also configured to detect the combustion abnormality on the basis of a change in the pressure inside the cylinder or a change in the vibration of the engine. In this manner, the combustion abnormality can be detected on the basis of a change in the pressure inside the cylinder or a change in the vibration of the engine, the changes being caused by the combustion abnormality.

In addition, the detection unit 24 may be configured to detect the combustion abnormality on the basis of the engine drive region. As a result, by calculating the relationship between the combustion abnormality and the engine drive region in advance, the combustion abnormality can be detected on the basis of the engine drive region where the combustion abnormality occurs.

The control unit 20*a* may also be configured to control the condition inside the cylinder by performing at least one of increasing or decreasing the amount or frequency by and at which the fuel is injected, delaying the timing of ignition, and controlling the exhaust device. In this manner, it is possible to suppress the combustion abnormality using the engine components mounted on the two-stroke engine 1.

The combustion abnormality monitoring device 50 for a two-stroke engine according to the present embodiment includes the detection unit 24 configured to detect combustion abnormality that is in-cylinder combustion triggered at a timing different from the timing of ignition, the storage unit 20*b* configured to store therein a detection result of the combustion abnormality detected by the detection unit 24, and the transmission unit 20*c* configured to transmit the detection result of the combustion abnormality stored in the storage unit 20*b* to the external device 25.

Because combustion abnormality that is in-cylinder combustion triggered at a timing different from the timing of ignition is detected, because the detection result of the combustion abnormality is stored, and because the detection result of the combustion abnormality is transmitted to the external device, by enabling the detection result of the combustion abnormality to be checked from the external device 25, and controlling the condition inside the cylinder in a manner suppressing abnormal combustion from the external device 25, the reliability of the engine 1 can be improved.

Furthermore, the storage unit 20*b* may be configured to store therein the detection result of the combustion abnormality detected by the detection unit 24, in a manner associated with the engine drive region. As a result, it is possible to identify the engine drive region where the combustion abnormality is likely to occur, and to set the engine drive region in a manner making it easier to suppress the abnormal combustion.

Furthermore, the storage unit 20*b* may be configured to store therein a control parameter for eliminating the combustion abnormality, the control parameter correspondingly to the combustion abnormality, and the transmission unit 20*c* may be configured to transmit the control parameter for eliminating the combustion abnormality to the external device 25, the control parameter corresponding to the detection result of the combustion abnormality stored in the storage unit 20*b*. In this manner, it is possible to cause the external device 25 to suppress abnormal combustion by using the control parameter.

Furthermore, the storage unit 20*b* may be configured to store therein information used in the maintenance of an engine component, the information corresponding to the combustion abnormality, and the transmission unit 20*c* may be configured to transmit the information used in the maintenance of the engine component to the external device 25, the information being information corresponding to the detection result of the combustion abnormality stored in the storage unit 20*b*. In this manner, the engine component can be maintained from the external device 25, using the information for the maintenance that is based on the combustion abnormality.

Furthermore, the combustion abnormality monitoring device 60 for a two-stroke engine according to the present embodiment includes the storage unit 26 configured to store therein big data that is an accumulation of a plurality of pieces of data related to a relationship between operation information of the engine and history information of a failure or maintenance of an engine component, the failure or the maintenance being based on combustion abnormality that is in-cylinder combustion triggered at a timing different from a timing of ignition, and the prediction unit 20*d* configured to predict information of the failure or the maintenance of the engine component from the operation information of the engine, on the basis of the big data stored in the storage unit 26.

Because big data that is an accumulation of a plurality of pieces of data related to the relationship between the operation information of the engine and the history information of a failure or maintenance of an engine component is stored, the failure or the maintenance being based on the combustion abnormality, and the information of the failure or maintenance of the engine component is predicted from the operation information of the engine on the basis of the stored big data, it is possible to predict a failure or maintenance of an engine component based on the combustion abnormality, from the engine operation information. Hence, the reliability can be improved.

The present disclosure is not limited to the embodiment explained above, and various improvements and design changes may be made within the scope not departing from the gist of the present disclosure.

What is claimed is:

1. A combustion abnormality monitoring device for a two-stroke engine, the two-stroke engine including a cylinder, a piston, a scavenging port on an inner peripheral surface of the cylinder and communicating with a crank chamber, and an exhaust port on the inner peripheral surface of the cylinder and communicating with an exhaust pipe, the scavenging port to be opened and closed by a reciprocating motion of the piston, the combustion abnormality monitoring device comprising:

a detection unit configured to detect a combustion abnormality in a form of in-cylinder combustion triggered at a timing different from a timing of ignition; and a control unit configured to control a condition inside the cylinder when the detection unit detects the combustion abnormality so as to reduce a frequency at which the combustion abnormality occurs by controlling an exhaust device to adjust an amount of opening of the exhaust port.

2. The combustion abnormality monitoring device for a two-stroke engine according to claim 1, further comprising a storage unit configured to store history information of an occurrence of past combustion abnormalities when the detection unit has detected any combustion abnormality in the past, wherein the control unit is further configured to control the condition inside the cylinder based on the history information of the occurrence of past combustion abnormalities, the history information being stored in the storage unit.

3. The combustion abnormality monitoring device for a two-stroke engine according to claim 1, wherein the control unit is further configured to control the condition inside the cylinder depending on a number of occurrences of the combustion abnormality, or on a scale of the combustion abnormality detected by the detection unit.

4. The combustion abnormality monitoring device for a two-stroke engine according to claim 1, wherein the control unit is further configured to control the condition inside the cylinder by, in addition to controlling the exhaust device to adjust the amount of opening of the exhaust port, changing at least one of a condition for injecting fuel, and a condition of ignition.

5. The combustion abnormality monitoring device for a two-stroke engine according to claim 1, wherein the control unit is further configured to control the condition inside the cylinder to a condition for eliminating the combustion abnormality.

6. The combustion abnormality monitoring device for a two-stroke engine according to claim 1, further comprising a storage unit configured to store a detection result of the combustion abnormality detected by the detection unit, and to store a control parameter for eliminating the combustion abnormality, the control parameter including information relating to the amount of opening of the exhaust port, wherein the control unit is further configured to control the condition inside the cylinder by controlling the engine using the control parameter stored in the storage unit.

7. The combustion abnormality monitoring device for a two-stroke engine according to claim 1, wherein the detection unit is further configured to detect the combustion abnormality based on a change in pressure inside the cylinder or a change in a vibration of the engine.

8. The combustion abnormality monitoring device for a two-stroke engine according to claim 1, wherein the detection unit is further configured to detect the combustion abnormality based on an engine drive region.

9. The combustion abnormality monitoring device for a two-stroke engine according to claim 1, wherein the control unit is further configured to control the condition inside the cylinder by, in addition to controlling the exhaust device to adjust the amount of opening of the exhaust port, performing at least one of increasing or decreasing an amount or frequency by or at which fuel is injected, and delaying a timing of ignition.

10. The combustion abnormality monitoring device for a two-stroke engine according to claim 1, wherein the control unit is further configured to control the condition inside the cylinder to reduce a frequency at which the combustion abnormality occurs, by adjusting the amount of opening and a timing for opening the exhaust port.

11. The combustion abnormality monitoring device for a two-stroke engine according to claim 1, wherein the control unit is further configured to control the condition inside the cylinder by controlling the exhaust device based on a degree of throttle opening and an engine rotation speed.

12. The combustion abnormality monitoring device for a two-stroke engine according to claim 1, wherein the control unit is further configured to control the condition inside the cylinder by changing a condition for injecting fuel, in addition to changing a condition of intake and exhaust by the exhaust device.

13. The combustion abnormality monitoring device for a two-stroke engine according to claim 1, further comprising a storage unit configured to store history information of an occurrence of a combustion abnormality when the detection unit detects the combustion abnormality, wherein the control unit is further configured to control the condition inside the cylinder based on the history information of the occurrence of the combustion abnormality, the history information being stored in the storage unit, and wherein the history information of the occurrence of the combustion abnormality includes information related to a relationship between an engine rotation speed and the combustion abnormality of the engine.

14. The combustion abnormality monitoring device for a two-stroke engine according to claim 1, further comprising a storage unit configured to store history information of an occurrence of a combustion abnormality when the detection unit detects the combustion abnormality, wherein the control unit is further configured to control the condition inside the cylinder based on the history information of the occurrence of the combustion abnormality, the history information being stored in the storage unit, and the history information of the occurrence includes information related to a relationship between an engine rotation speed, a throttle opening, and the combustion abnormality of the engine.

15. A combustion abnormality monitoring device for a two-stroke engine, the two-stroke engine including a cylinder, a piston, a scavenging port on an inner peripheral surface of the cylinder and communicating with a crank chamber, and an exhaust port on the inner peripheral surface of the cylinder and communicating with an exhaust pipe, the scavenging port to be opened and closed by a reciprocating motion of the piston, the combustion abnormality monitoring device comprising:

a detection unit configured to detect a combustion abnormality in a form of in-cylinder combustion triggered at a timing different from a timing of ignition;

a storage unit configured to store a detection result of the combustion abnormality detected by the detection unit; and a transmission unit configured to transmit to an external device the detection result of the combustion abnormality stored in the storage unit, wherein the detection result includes information related to a relationship between an engine rotation speed, a throttle opening, and the combustion abnormality of the two-stroke engine.

16. The combustion abnormality monitoring device for a two-stroke engine according to claim 15, wherein the storage unit is configured to store the detection result of the combustion abnormality detected by the detection unit, in association with an engine drive region.

17. The combustion abnormality monitoring device for a two-stroke engine according to claim 15, wherein:

the storage unit is further configured to store a control parameter for eliminating the combustion abnormality, the control parameter corresponding to the combustion abnormality, and the transmission unit is further configured to transmit the control parameter for eliminating the combustion abnormality to an external device, the control parameter corresponding to the detection result of the combustion abnormality, the detection result being stored in the storage unit.

18. The combustion abnormality monitoring device for a two-stroke engine according to claim 15, wherein:

the storage unit is further configured to store information used in maintenance of an engine component, the information corresponding to the combustion abnormality, and the transmission unit is further configured to transmit the information used in the maintenance of the engine component to the external device, the information corresponding to the detection result of the combustion abnormality, the detection result being stored in the storage unit.

19. A combustion abnormality monitoring device for a two-stroke engine, the two-stroke engine including a cylinder, a piston, a scavenging port on an inner peripheral surface of the cylinder and communicating with a crank chamber, and an exhaust port on the inner peripheral surface of the cylinder and communicating with an exhaust pipe, the scavenging port to be opened and closed by a reciprocating motion of the piston, the combustion abnormality monitoring device comprising:

a storage unit configured to store big data comprising an accumulation of a plurality of pieces of data related to a relationship between operation information of the two-stroke engine and history information of a failure and maintenance of an engine component, the failure and the maintenance being based on a combustion abnormality in a form of in-cylinder combustion triggered at a timing different from a timing of ignition; and a prediction unit configured to predict information of the failure and the maintenance of the engine component from the operation information of the two-stroke engine, based on the big data stored in the storage unit, wherein the operating information of the two-stroke engine includes environmental information of the two-stroke engine and running information of the two-stroke engine.

* * * * *